(12) United States Patent
Beser

(10) Patent No.: US 7,389,528 B1
(45) Date of Patent: Jun. 17, 2008

(54) OPERATING CABLE MODEMS IN A LOW POWER MODE

(75) Inventor: Nurettin Burcak Beser, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1157 days.

(21) Appl. No.: 10/355,244

(22) Filed: Jan. 31, 2003

Related U.S. Application Data (60) Provisional application No. 60/433,770, filed on Dec. 17, 2002.

(51) Int. Cl.
*H04B 1/38* (2006.01)
*G06F 15/16* (2006.01)

(52) U.S. Cl. .................. 725/111; 455/557; 709/217
(58) Field of Classification Search .............. 725/111
See application file for complete search history.

(56) References Cited

U.S. PATENT DOCUMENTS

| | | | |
|---|---|---|---|
| 6,690,655 B1 * | 2/2004 | Miner et al. | 370/278 |
| 6,785,564 B1 * | 8/2004 | Quigley et al. | 455/574 |
| 7,046,680 B1 * | 5/2006 | McDysan et al. | 370/396 |
| 7,139,829 B2 * | 11/2006 | Wenzel et al. | 709/232 |

* cited by examiner

*Primary Examiner*—Christopher Grant
*Assistant Examiner*—Shelton Austin
(74) *Attorney, Agent, or Firm*—Harrity Snyder, LLP

(57) ABSTRACT

An apparatus may include a receiver configured to receive chunks of data on a downstream channel from a cable modem termination system. The receiver may be further configured to enter a low power state in which the chunks of data cannot be received. Wake up circuitry may be configured to monitor data in the downstream channel for a wake up signal when the receiver is in the low power state.

25 Claims, 5 Drawing Sheets

OPERATING CABLE MODEMS IN A LOW POWER MODE

RELATED APPLICATION

This application claims the benefit of U.S. Provisional Application No. 60/433,770, filed Dec. 17, 2002, under 35 U.S.C. § 119(e), the entire contents of which are incorporated herein by reference.

BACKGROUND OF THE INVENTION

1. Field of the Invention

The present invention relates generally to power saving modes for electrical devices, and more particularly, to power saving modes for cable modem systems.

2. Description of Related Art

In cable modem systems, a cable modem termination system (CMTS) at one end of a cable network typically services multiple cable modems (CMs) connected to the cable network. CMs are generally installed locally at the end-user's location, and communicate with the CMTS, which may be installed at a cable company's facility. Lately, there has been interest in operating CMs as Multimedia Terminal Adapters (MTAs) by running a Voice over IP (VoIP) application on the CMs. The voice service provided by such a CM/MTA may be considered a "primary line" service. In other words, the voice service provided by the CM/MTA may be the primary way a user connects to other people and/or emergency services via the public switched telephone network (PSTN).

In the event of power loss, it is desirable for the user of the CM/MTA still to be able to originate calls, receive calls, be notified of incoming calls (e.g., by ringing), and so on. During such power loss, the CM/MTA may still receive power from an internal power source or uninterruptible power supply (UPS). To avoid excessive drain on the UPS, and to draw lower average power in general, it may be desirable for the CM/MTA to operate in a low power mode (i.e., a "power saving" mode).

For example, it may be desirable for the CM/MTA to operate in a low power mode during periods of non-use, so that the long-term, average power consumption of the device is less than about 3 Watts. Further, low power operation of one CM should not adversely affect operation of other CMs served by the same CMTS. The current Data over Cable Service Interface Specification (DOCSIS) protocols (e.g., DOCSIS 1.1, 2.0), however, contain no provision for operating CMs in a low power mode.

Therefore, there exists a need to reduce power consumption of CMs in cable modem systems.

SUMMARY OF THE INVENTION

Systems consistent with the principles of the invention address this and other needs by providing a low power mode for components in CMs, while maintaining a mechanism for an associated CMTS to wake up a CM that is in the low power mode.

In accordance with one aspect of the invention as embodied and broadly described herein, an apparatus may include a receiver configured to receive chunks of data on a downstream channel from a cable modem termination system. The receiver may be further configured to enter a low power state in which the chunks of data cannot be received. Wake up circuitry may be configured to monitor data in the downstream channel for a wake up signal when the receiver is in the low power state.

In another implementation consistent with principles of the invention, a cable modem termination system may include a transmitter for sending chunks of data to one or more cable modems on a downstream channel. Signaling circuitry may be configured to insert a wake up message into the chunks of data on the downstream channel. The wake up message is for causing a device to exit a low power mode.

In a further implementation consistent with principles of the invention, a method of low power operation in a cable modem system may include deciding to enter a low power state and removing power from at least one of a transmitter and a receiver. A separate downstream communication channel may be monitored for a wake up message. The method may also include supplying power to the at least one of the transmitter and the receiver upon reception of the wake up message.

In still another implementation consistent with principles of the invention, a system may include a multimedia terminal adapter and a cable modem termination system. The multimedia terminal adapter may include a receiver and wake up circuitry. The receiver may be configured to receive chunks of data on a downstream channel and may be further configured to be placed into a low power mode. The wake up circuitry may be configured to monitor data on the downstream channel for a wake up signal when the receiver is in the low power mode. The cable modem termination system may be operatively connected to the multimedia terminal adapter by the downstream channel and may include a transmitting portion and signaling circuitry. The transmitting portion may be configured to send the chunks of data to the multimedia terminal adapter. The signaling circuitry may be configured to insert the wake up signal into the chunks of data for causing the multimedia terminal adapter to exit the low power mode.

In yet another implementation consistent with principles of the invention, a multimedia terminal adapter may include a receiver configured to receive chunks of data on a downstream channel from a cable modem termination system. Control circuitry may be configured to selectively remove power from the receiver. Wake up circuitry may be configured to monitor the chunks of data on the downstream channel for a wake up signal when the power has been removed from the receiver.

In a further implementation consistent with principles of the invention, a method of low power operation in a cable modem system may include receiving a sleep message from a cable modem indicating the decision of the cable modem to enter a low power state. The method may also include stopping one or more timers that control removal of inactive cable modems from an active list due to inactivity of the inactive cable modems. The one or more timers may be stopped in response to the sleep message.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention may use respective, dedicated wake up and signaling circuitry in a CM and a CMTS to return the CM, whose receiver has been placed into a low power mode, to normal operation. The low power mode may also be referred to as a "sleep mode" or a "power saving mode" as will be understood by those skilled in the electronics art.

System Overview

Figure 1:
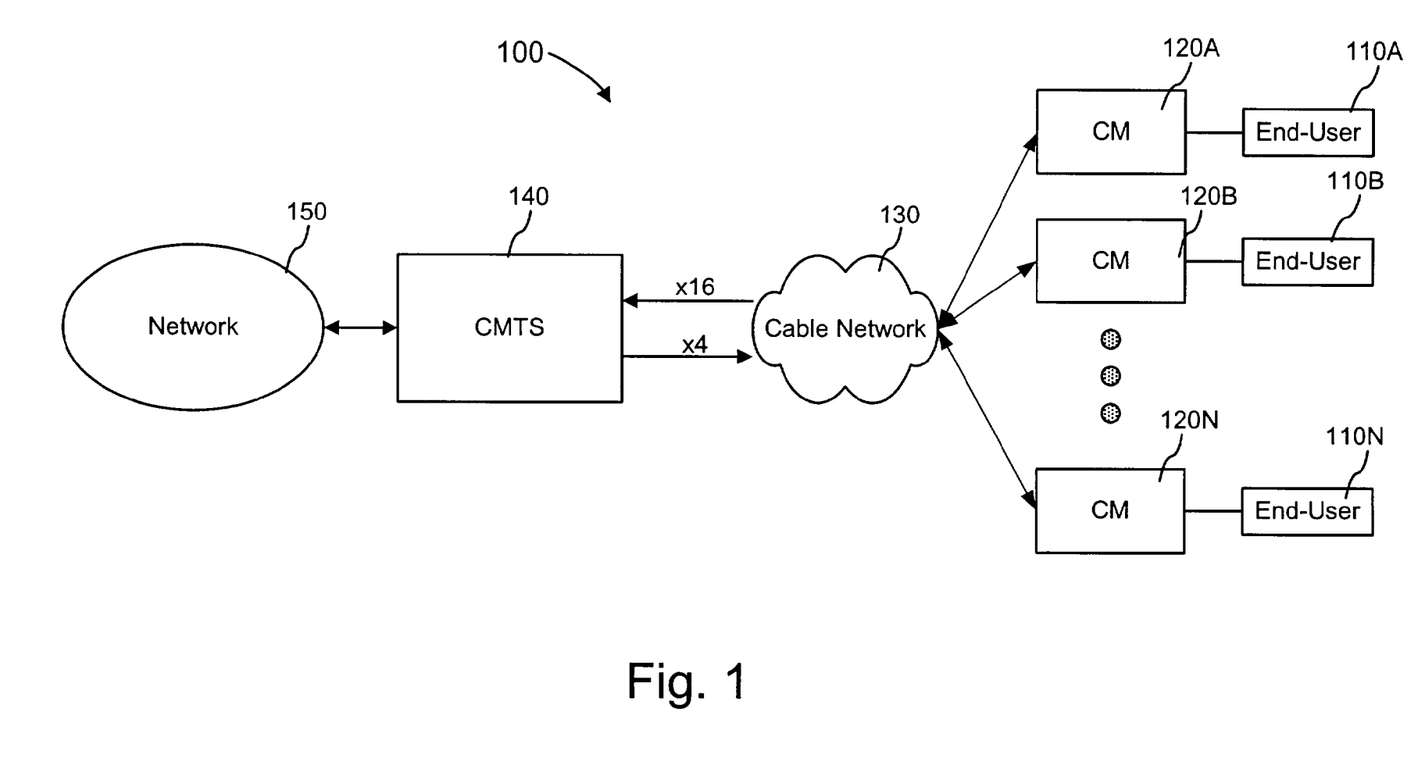
FIG. 1 is a diagram illustrating an exemplary system in which concepts consistent with aspects of the invention may be implemented.

FIG. 1 is a diagram illustrating an exemplary system 100 in which concepts consistent with aspects of the invention may be implemented. System 100 may include a number of end users 110A-110N (collectively "users 110"), a number of cable modems (CMs) 120A-120N (collectively "CMs 120"), a cable network 130, a cable modem termination system (CMTS) 140, and a network 150.

End-users 110 may connect to the cable network 130 through CMs 120. The CMs 120 typically are installed local to the respective end-users 110. End-users 110 may include a device or a network (e.g., LAN) of devices that may include a television, a computer, a telephone, or any other type of equipment that can receive and/or send data via cable network 130. A LAN at an end-user 110 may include one or more of a wired network and a wireless network served by, for example, a switch, router, or a computer's network interface.

Cable network 130 may include a coaxial or hybrid optical fiber/coaxial (HFC) cable network. Cable modems 120 may interconnect with the cable network 130 via coaxial cable/optical fiber.

CMTS 140 may facilitate communications between cable modems 120 and network 150. CMTS 140 may be maintained by a cable company at a facility in relative proximity to end-users 110. CMTS 140 may include a number of upstream (i.e., from the cable modem to the CMTS) channels and downstream (i.e., from the CMTS to the cable modem) channels. For example, the group of CMs 120 may be served by 16 upstream channels and four downstream channels. The downstream channels may be higher bandwidth channels than the upstream channels. CMs 120 may share both upstream and downstream channels by time-multiplexing data on these channels. CMs 120 transmit data units, called bursts, to CMTS 140 during pre-assigned time slots.

Network 150 may include one or more networks of any type, including a Public Land Mobile Network (PLMN), Public Switched Telephone Network (PSTN), local area network (LAN), metropolitan area network (MAN), wide area network (WAN), the Internet, or an intranet.

It will be appreciated that the number of components illustrated in FIG. 1 is provided for explanatory purposes only. A typical network may include more or fewer components than are illustrated in FIG. 1.

Exemplary Downstream/Upstream Communication

Figure 2:
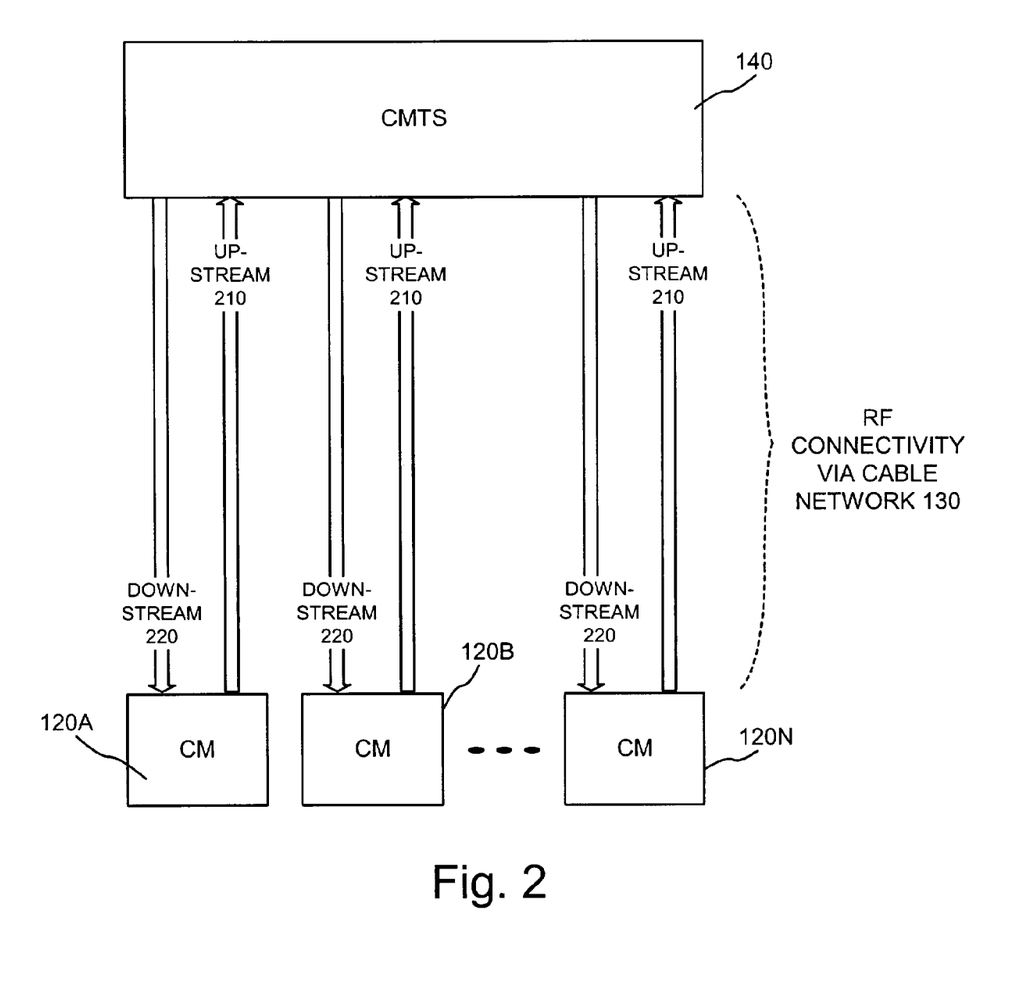
FIG. 2 is a diagram of exemplary upstream/downstream communications between a CMTS and multiple cable modems in the system of FIG. 1 according to an implementation consistent with the principles of invention.

FIG. 2 illustrates exemplary upstream and downstream communication between a CMTS 140 and CMs 120 according to an implementation consistent with the principles of the invention. As illustrated in FIG. 2, CMTS 140 and CMs 120 interconnect via upstream 210 and downstream 220 channels of cable network 130. Each upstream channel 210 and downstream channel 220 may communicate via a different frequency. Each upstream channel 210 may further include multiple "virtual" channels. Each virtual upstream channel may include a multiplexed timeslot of the upstream channel frequency. Each virtual upstream channel may further be associated with different transmission characteristics of CMs 120. Such different transmission characteristics may include a different channel profile, such as different TDM timeslot size, symbol rate, frequency, preamble pattern, and/or burst profile. The different burst profile may include a different modulation, pre-amble length, data block size (e.g., Reed-Solomon block size), error correction (e.g., Reed-Solomon error correction), scrambling or encryption, encoding (e.g., differential encoding), maximum burst size, and/or guard time size.

The upstream channels 210 from cable modems 120 may, thus, include frequency bandwidth divided into multiple channels, with each channel possibly further time division multiplexed into multiple virtual upstream channels. CMTS 140 may transmit messages and chunks of data (e.g., bytes, packets, etc.) to each CM 120 on a downstream channel 220 and may receive transmissions from each cable modem via an upstream channel 210.

Exemplary Cable Modem Termination System and Cable Modems

Figure 3:
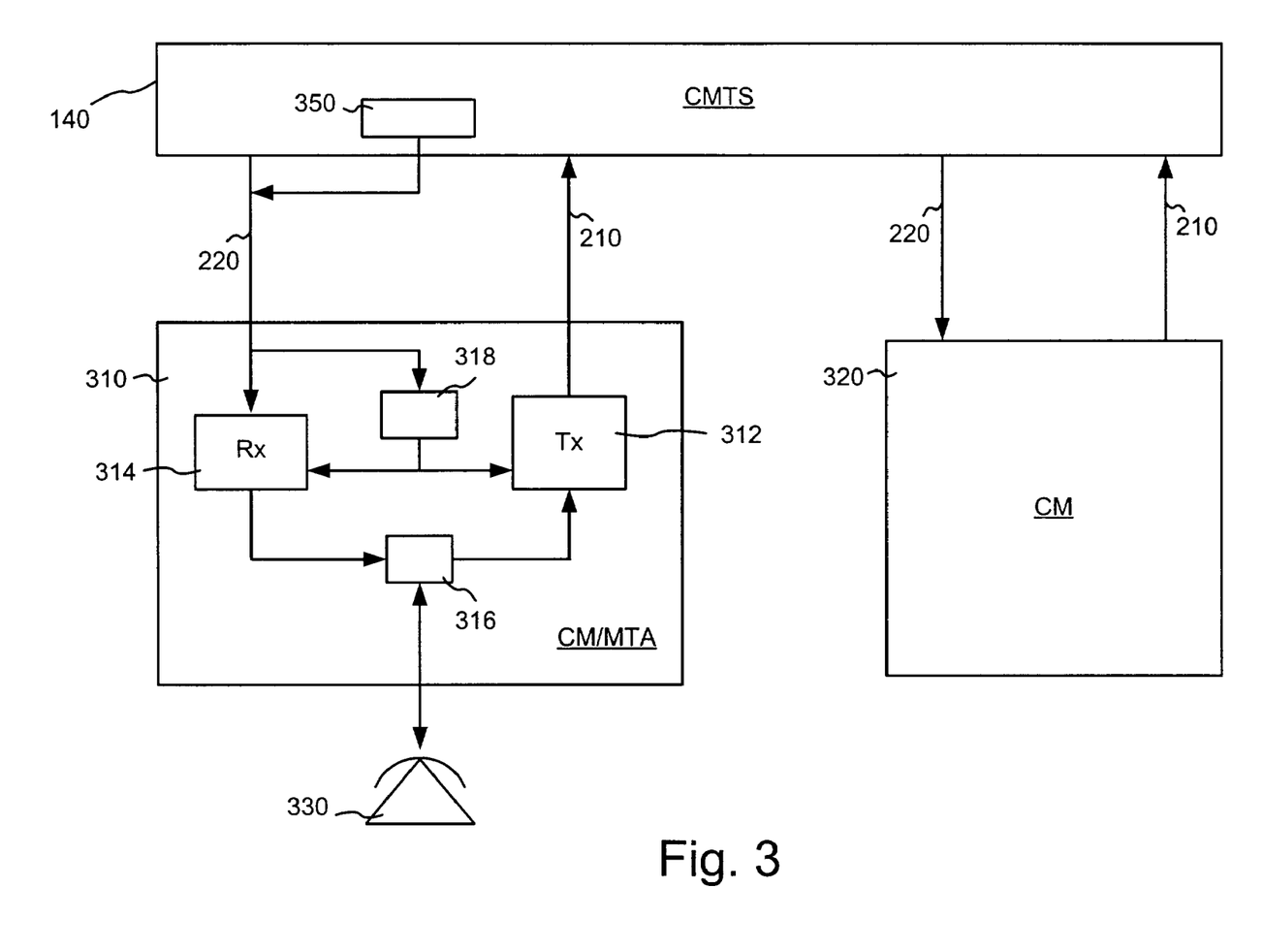
FIG. 3 is a diagram of an exemplary CMTS and CMs according to an implementation consistent with the principles of invention.

FIG. 3 is a diagram of an exemplary CMTS 140, a CM/MTA 310, and a CM 320 according to an implementation consistent with the principles of invention. Also illustrated is telephone device 330 configured to send voice data to CMTS 140 via VoIP applications in CM/MTA 310. CM 320 may be configured in some implementations as an MTA and connected to another telephone device, but for the purpose of explanation, CM 320 will be treated as a data CM.

CM/MTA 310 may include a transmitter (Tx) 312, a receiver (Rx) 314, interface circuitry 316, and wake-up circuitry 318. CM 320 may be similarly configured, with or without interface circuitry 316 for MTA operation. Elements 312, 314, 316, and 318 are logical blocks that may reside in a single chip or on multiple chips.

Tx 312 may be configured to transmit data to CMTS 140 on upstream channel 210. Tx 312 may be controlled, for example by interface circuitry 316 or another controller, to send data to CMTS 140 only in time slots that were assigned by CMTS 140, as will be understood by those skilled in the cable modem art. In one implementation consistent with the principles of the invention, Tx 312 may be "powered down" to operate in a low power mode by removing a voltage supply from Tx 312. Such removal of voltage may be controlled by interface circuitry 316 or another controller in a manner known to those skilled in the circuit design arts. In an alternate implementation, Tx 312 may use sufficiently low power to be considered "powered down" if it is instructed not to transmit data.

Rx 314 may be configured to receive data from CMTS 140 on downstream channel 220. One constraint when "powering down" Rx 314 to operate in a low power mode is that CM/MTA 310 should still retain communication capabilities (i.e., the ability to receive, for example, a "wake-up" message from CMTS 140). The structure of Rx 314 and its implication for power saving modes will be discussed in greater detail with respect to FIG. 4.

Figure 4:
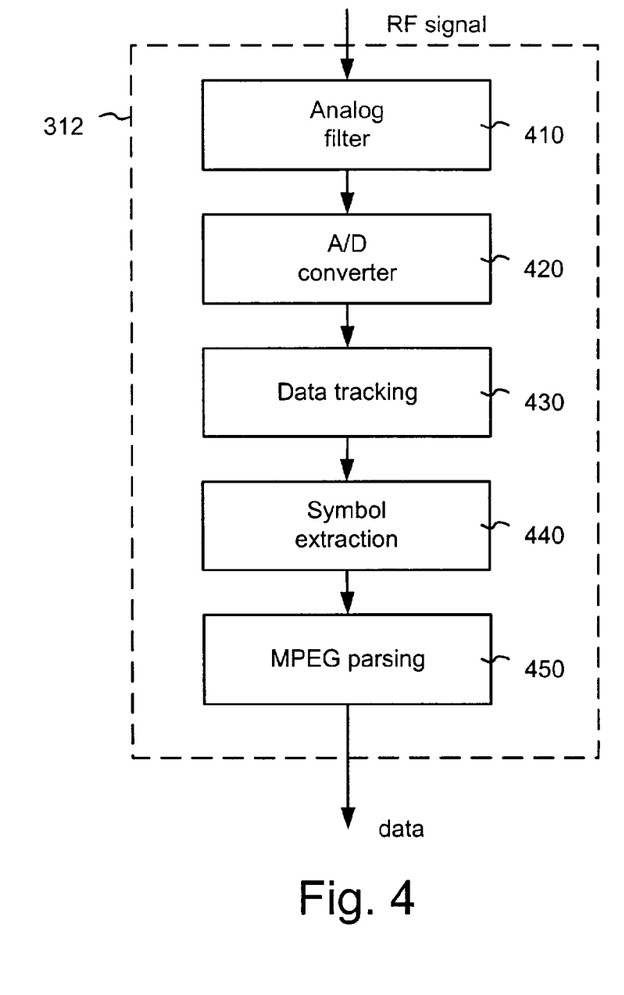
FIG. 4 is a diagram of the receiver (Rx) of FIG. 3 according to an implementation consistent with the principles of the invention.

FIG. 4 is a diagram of Rx 314 according to an implementation consistent with the principles of the invention. Rx 314 may include an analog filter 410, an analog-to-digital (A/D) converter 420, data tracking circuitry 430, symbol extraction circuitry 440, and MPEG audio parsing circuitry 450. Analog filter 410 and A/D converter 420 may be considered analog circuitry, while the remaining elements 430-450 may be considered digital circuitry.

Analog filter 410 may extract information from a certain frequency/channel of an input RF signal. The bandwidth and critical frequency of analog filter 410 may be programmable, so that it may select one of several available downstream frequencies/channels. A/D converter 420 may be configured to convert the filtered signal from analog filter 410 to a digital signal.

Data tracking circuitry 430 may be configured to separate the digital signal from A/D converter 430 into usable data for later circuitry. For example, if the data transmitted by CMTS 140 is in quadrature format, data tracking circuitry 430 may determine into which quadrant a particular portion of the digital signal should fall. Symbol extraction circuitry 440 may extract symbols or other units of information (e.g., characters or words) from the data output by data tracking circuitry 430. MPEG audio parsing circuitry 450 may be configured to produce audio signals from the symbols output by symbol extraction circuitry 440.

In one implementation consistent with the principles of the invention, Rx 314 may enter a low power mode by turning off, or otherwise removing power from, the digital components: data tracking circuitry 430, symbol extraction circuitry 440, and MPEG audio parsing circuitry 450. Such an implementation would result in approximately a 50% reduction in power use by Rx 314 during low power mode. In such an implementation, the analog components (i.e., analog filter 410 and A/D converter 420) would remain powered, because Rx 314 should retain the capability to receive (and act upon) a wake-up signal from CMTS 140. In such an implementation, however, the 50% of normal power used by analog filter 410 and A/D converter 420 may or may not still be considered too high.

Returning to FIG. 3, interface circuitry 316 may provide an interface for exchanging audio and control data with telephone device 330. In other words, interface circuitry 316 may allow CM 310 to function as an MTA. Interface circuitry 316 may be configured to route data from Rx 314 to telephone device 330, and may also route data from telephone device 330 to Tx 312. In one implementation consistent with the principles of the invention, interface circuitry 316 may control the communication of certain types of data, such as a sleep mode notification message sent to CMTS 140. When interface circuitry 316, or another controller in CM/MTA 310, determines that low power mode should be initiated, interface circuitry 316 may direct Tx 312 to send such a sleep mode notification message.

In one implementation consistent with the principles of the invention, wake-up circuitry 318 may be configured to receive a wake-up message from CMTS 140 on downstream channel 220 during a low power mode of CM/MTA 310. Wake-up circuitry 318 may be configured to receive a specifically-modulated signal, such as the IP or hardware address of CM/MTA 310, which may be amplitude modulated (AM), frequency modulated (FM), time division multiplexed, or code division multiplexed. Wake-up circuitry 318 may be configured to recognize its address in the received signal, and to wake up (i.e., resume power to) other elements in CM 310, such as Tx 312, Rx 314, and interface circuitry 316.

Wake-up circuitry 318 may be designed to consume lower power than the analog filter 410 and A/D converter 420 in Rx 314. Because wake-up circuitry 318 may monitor downstream channel 220 during CM/MTA 310's low power mode, power may be removed from all components 410-450 (i.e., analog and digital) of Rx 314. Wake-up circuitry 318 (e.g., a low power FM receiver) need only be able to reliably receive a wake-up signal (e.g., CM/MTA 310's address or other unique identifier) and wake up other components of CM/MTA 310. Subject to these performance constraints, those skilled in the communication art will understand that wake-up circuitry 318 make include a number of circuit designs that may consume relatively little power when operating.

Telephone device 330 may be configured to generate VoIP data from input audio data, and to decode received audio data into a sound signal for a user. Telephone device 330 may include, for example, a handset, a dialing apparatus (e.g., a key pad), and circuitry to generate and decode VoIP data. Those skilled in the telephony art will understand the structure and operation of typical telephone device 330. In other implementations, telephone device 330 may be a conventional telephone for which CM/MTA 310 handles any VoIP to audio conversions.

CMTS 140 may include signaling circuitry 350 corresponding to the wake-up circuitry 318 in CM/MTA 310 (and possibly CM 320). Signaling circuitry 350 may be configured to send the wake-up message to bring CM 310/320 out of low power mode when, for example, an incoming telephone call or other event (e.g., a timer timing out due to synchronization loss with CMTS, or user making a phone call) dictates that CM 310/320 be returned to normal operation. Signaling circuitry 350 may be configured to generate a CM-specific wake-up message, such as a message addressed to CM 310 (or CM 310's address itself), and may also be configured to insert this wake-up message in normal downstream data communications on channel 220. Signaling circuitry 350 may be configured to encode the wake-up message in a format that the wake-up circuitry may decode, such as an AM signal, an FM signal, a time division multiplexed signal, or a code division multiplexed signal.

In one implementation consistent with the principles of the invention, signaling circuitry 350 and wake-up circuitry 318 may use a dedicated downstream channel to communicate, which is different than the normal downstream channel 220 used by CM 310 for downstream data communication. In such an implementation, wake-up messages from CMTS 140 would not interfere with downstream data on channel 220 that is intended for other CMs that are not in a low power mode, such as CM 320. By using a different downstream channel for wake-up messages to CMs in a low power state, CMTS 140 would not affect the operation of other CMs (e.g., 320) that are not in low power mode. In such an implementation, however, the total downstream bandwidth available to CMTS 140 is lowered, because the dedicated downstream channel(s) used for wake-up messages may not be used for ordinary downstream data communication.

In another implementation consistent with the principles of the invention, signaling circuitry 350 and wake-up circuitry 318 may be configured to use the normal downstream data channel 220 for wake-up messages. Downstream data chunks from CMTS 140 are typically interleaved, and also typically have associated error correction schemes (e.g., checksums), as understood by those skilled in the cable modem art. For these and other reasons, downstream data chunks may have an error rate (e.g., 1 in $10^8$ bits) that is better than a nominal error rate (e.g., 1 in $10^6$ bits) that is correctable at CMs 310/320 by the associated error correction schemes. As a result, discrete units of time may exist within a chunk or chunks of data which may be used to transmit other data than the chunks. Any other data inserted at these times will be "corrected" by the error correction scheme at Rx 314 of receiving CMs and/or MTAs, but this other data may still be useful to wake up circuitry 318.

Accordingly, signaling circuitry 350 may insert relatively small wake-up messages in the downstream data on channel 220, without causing the error rate (e.g., 8 in $10^7$ bits) to be worse than the nominal error correction rate. Wake-up circuitry 318 in any low-powered CMs (e.g., 310) may recognize the wake-up messages and rouse Tx 312 and Rx 314 if appropriate. Other normally operating CMs (e.g., 320) will see these wake-up messages as "noise" in their data, and the error correction schemes associated with the downstream data chunks will prevent the wake-up messages from affecting the operation of these CMs.

Exemplary Process

Figure 5:
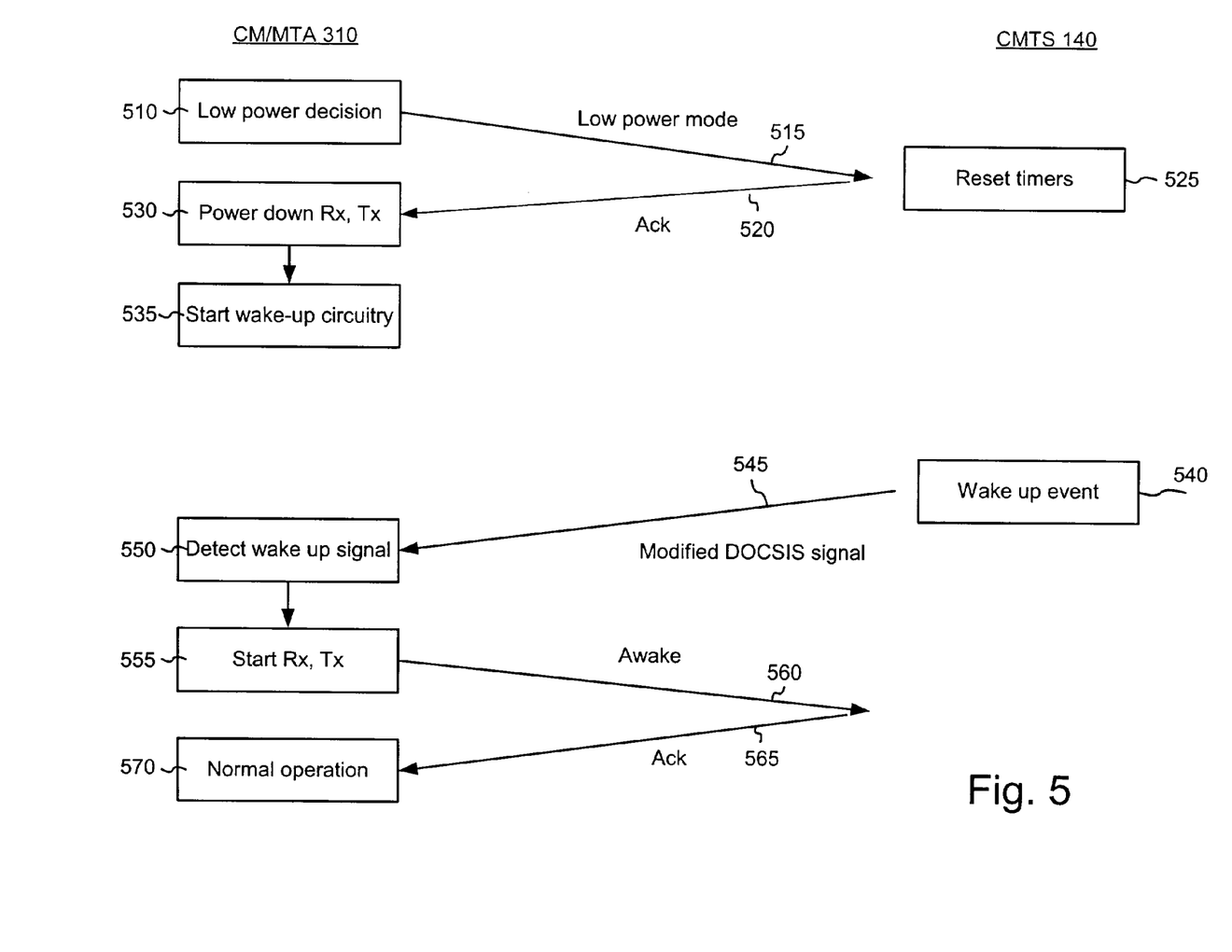
FIG. 5 illustrates an exemplary process for entering and exiting a CM power saving mode consistent with the principles of the invention.

FIG. 5 illustrates an exemplary process for entering and exiting a CM power saving mode consistent with the principles of the invention. The process may begin with CM/MTA 310 making a decision to enter a low-power mode [act 510]. The decision by CM/MTA 310 may be influenced by a local power outage, or it may be the result of some continuous period (e.g., 30-60 minutes) of inactivity. CM/MTA 310 may send a sleep mode notification message to CMTS 140 on upstream channel 210 via Tx 312 [act 515].

If CMTS 140 allows CM/MTA 310 to enter a low power mode, it may stop and/or reset short term timers that would otherwise flag/remove CM/MTA 310 after some period of inactivity [act 525]. Longer-term timers may still require CM/MTA 310 to respond after some period of inactivity. CMTS 140 may allow CM/MTA 310 to enter the low power mode if no messages are incoming for CM/MTA 310. CMTS 140 may also send an acknowledgment (Ack) message to CM/MTA 310 on downstream channel 220 [act 520]. The Ack message conveys to CM/MTA 310 that it has approval to enter the requested low power mode.

Upon receiving the Ack message, CM/MTA 310 (e.g., wake-up circuitry 318 or a controller in CM/MTA 310) may power down certain circuitry (e.g., Tx 312, Rx 314, etc.) to cause CM/MTA 310 to enter the low power mode [act 530]. Powering down such circuitry may include disconnecting or switching a voltage supply from such circuitry. After or concurrent with entering the low power mode, wake-up circuitry 318 may begin listening for a wake-up message from CMTS 310, such as the address of CM/MTA 310 [act 535]. In one implementation consistent with the principles of the invention, act 535 may include providing power to wake-up circuitry 318, which may not receive power or operate when CM/MTA 310 is not in the low power mode.

When in low-power mode CM/MTA 310 may listen to a separate downstream channel or from time to time activate the downstream receiver 314 or use the low-power receiver 312 to ensure that the synchronization between CMTS 140 and the CM/MTA 310 is not lost.

At some point after sending the Ack signal, CMTS 140 may determine, via a wake up event occurring, that CM/MTA 310 needs to exit low power mode [act 540]. Such a wake up event may be the arrival of a telephone call for CM/MTA 310. Another wake up event may be the expiration of a long term timer in CMTS 140, at which point it may be beneficial for CMTS 140 to check on the operation of CM/MTA 310 by causing it to exit low power mode. Other wake up events are possible, and will be apparent to one skilled in the telecommunication art. CMTS 140 may encode a wake-up signal into the existing DOCSIS downstream data on channel 220 [act 545].

Wake-up circuitry 318 may receive and recognize the wake-up signal from CMTS 140 [act 550]. In one implementation, recognizing the wake-up signal includes detecting the address of CM/MTA 310 within data in downstream channel 220. The format of the wake-up signal (e.g., an FM signal) may differ from that of the other data in downstream channel 220. Other types and formats of wake-up signals are possible. Wake-up circuitry 318 or another controller in CM/MTA 310 may provide power to the circuitry (e.g., Tx 312, Rx, 314) from which power was removed to enter low power mode [act 555].

CM/MTA 310 may send (via Rx 314) an "awake" message to CMTS 140 indicating that it has returned to normal-power operation [act 560]. CMTS 140 may acknowledge the awake message with a normal DOCSIS message on downstream channel 220 [act 565]. The Ack message may be received by Rx 314, and CM/MTA 310 may resume normal (i.e., non-low power) operation [act 570]. For example, CM/MTA 310 may query CMTS 140 to see if there are any pending messages or telephone calls that may have triggered its exit from the low power mode.

In one implementation, after the 'sleeping' message [act 515] from CM/MTA 310, CMTS 140 may stop and reset timers that might otherwise cause CM/MTA 310 to be removed from the list of active CM/MTAs 310 due to its inactivity in accordance with DOCSIS specifications. One example of such timer-driven events is Station Maintenance messages from CMTS 140. For example, CMTS 140 may send a Station Maintenance message to CM 310 every 2 seconds, and after 16 or so re-tries, CMTS 140 may decide that CM 310 is no longer alive and may remove it from its list of active CM/MTAs 310. CMTS may, at the same time, drop all the packets destined for the now-inactive CM/MTA 310.

In contrast to such an example, and consistent with the principles of the invention, by receiving the 'sleeping' message [act 515] CMTS 140 may stop and reset certain timers [act 525] so that it will not send Station Maintenance messages. Hence, CMTS 140 will not remove the CM 310 for failure to respond. Although such a scheme may not allow CM/MTA 310 to power off Tx/Rx circuitry 312/314, it may advantageously allow powering down of the processor (not shown) in CM/MTA 310 that processes DOCSIS MAC management messages and performs other functions. Normally, such processing would consumes a considerable power in CM/MTA 310. Even though the power savings to CM/MTA 310 in such an implementation may be less than in other schemes (e.g., turning off Tx 312, Rx 314, etc. as described above in act 530), this implementation does not necessitate hardware upgrade/change to CM/MTA 310.

CONCLUSION

Consistent with the principles of the present invention, a low power mode for components in CMs may be utilized, while maintaining a mechanism for an associated CMTS to wake up a CM that is in the low power mode. The mechanism may include circuitry in the CM other than the receiver to cause components of the CM to exit the low power mode.

The foregoing description of embodiments of the present invention provides illustration and description, but is not intended to be exhaustive or to limit the invention to the precise form disclosed. Modifications and variations are possible in light of the above teachings or may be acquired from practice of the invention.

For example, it should be noted that CMs which just handle data may also contain wake up circuitry 318 so that such CMs may enter a low power mode. Further, multiple CMs or MTAs that are serviced by the same CMTS may enter and exit the low power mode, as long as there are enough distinct wake up signals/messages available so that the CMTS may wake one CM/MTA without waking others.

While a series of acts has been described in FIG. 5, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. An apparatus, comprising:
   a receiver configured to receive chunks of data on a downstream channel from a cable modem termination system, the receiver being further configured to enter a low power state in which the chunks of data cannot be received; and
   wake up circuitry configured to monitor data in the downstream channel for a wake up signal when the receiver is in the low power state, where the wake up signal is inserted into the chunks of data and portions of the chunks of data are overwritten.

2. The apparatus of claim 1, wherein the wake up circuitry is further configured to cause the receiver to exit the low power state when the wake up signal is received.

3. The apparatus of claim 1, wherein the wake up circuitry is further configured to identify the wake up signal when an address in the data in the downstream channel matches a corresponding address of the apparatus.

4. The apparatus of claim 1, wherein the wake up circuitry includes one of an amplitude modulation receiver, a frequency modulation receiver, and a code division modulation receiver.

5. The apparatus of claim 1, further comprising:
   a transmitter configured to transmit chunks of data to the cable modem termination system, the transmitter being further configured to enter a low power mode.

6. The apparatus of claim 5, wherein the wake up circuitry is further configured to cause the transmitter to exit the low power state when the wake up signal is received.

7. The apparatus of claim 1, further comprising:
   interface circuitry configured to transfer data from the receiver to a telephone device that is connected to the apparatus.

8. A cable modem termination system, comprising:
   a transmitter for sending chunks of data to one or more cable modems on a downstream channel; and
   signaling circuitry configured to insert a wake up message into the chunks of data on the downstream channel for causing a device to exit a low power mode, where the signaling circuitry is further configured to overwrite portions of the chunks of data.

9. The cable modem termination system of claim 8, wherein the signaling circuitry includes one of an amplitude modulator, a frequency modulator, and a code division modulator to modulate the wake up message.

10. A method of low power operation in a cable modem system, comprising:
    deciding to enter a low power state;
    removing power from at least one of a transmitter and a receiver;
    monitoring a downstream communication channel for a wake up message, where the wake up message is inserted into chunks of data on the downstream communication channel and portions of the chunks of data are overwritten; and
    supplying power to the at least one of the transmitter and the receiver upon reception of the wake up message.

11. The method of claim 10, further comprising:
    sending a sleep message indicating the decision to enter the low power state; and
    receiving an acknowledgement of the sleep message.

12. The method of claim 11, wherein the removing occurs after the receiving.

13. The method of claim 10, wherein the removing includes removing power from both the transmitter and the receiver.

14. The method of claim 10, wherein the monitoring includes determining whether a specific identifier is present in data on the downstream communication channel.

15. The method of claim 10, wherein the supplying includes supplying power to both the transmitter and the receiver.

16. The method of claim 10, further comprising:
    sending an awake message indicating an exit from the low power state; and
    receiving an acknowledgement of the awake message.

17. A system, comprising:
    a multimedia terminal adapter including:
       a receiver configured to receive chunks of data on a downstream channel and further configured to be placed into a low power mode, and
       wake up circuitry configured to monitor data on the downstream channel for a wake up signal when the receiver is in the low power mode; and
    a cable modem termination system operatively connected to the multimedia terminal adapter by the downstream channel, the cable modem termination system including:
       a transmitting portion configured to send the chunks of data to the multimedia terminal adapter, and
       signaling circuitry configured to insert the wake up signal into the chunks of data for causing the multimedia terminal adapter to exit the low power mode, where the signaling circuitry is further configured to overwrite portions of the chunks of data.

18. The system of claim 17, wherein the multimedia terminal adapter further includes:
a transmitter configured to transmit chunks of data to the cable modem termination system, the transmitter being further configured to be placed into the low power mode.

19. The system of claim 18, further comprising:
a telephone device operatively coupled to the receiver and the transmitter, the telephone device being configured to send and receive voice data.

20. The system of claim 17, wherein the wake up circuitry and the signaling circuitry are respectively configured to demodulate the wake up signal and to modulate the wake up signal using a common modulation scheme.

21. The system of claim 20, wherein the common modulation scheme differs from a transmission format used by the transmitting portion to send the chunks of data to the multimedia terminal adapter.

22. A multimedia terminal adapter, comprising:
a receiver configured to receive chunks of data on a downstream channel from a cable modem termination system;
control circuitry configured to selectively remove power from the receiver, and
wake up circuitry configured to monitor the chunks of data on the downstream channel for a wake up signal when the power has been removed from the receiver, where the wake up signal is inserted into the chunks of data and portions of the chunks of data are overwritten.

23. The multimedia terminal adapter of claim 22, wherein the wake up circuitry is further configured to cause the control circuitry to restore power to the receiver when the wake up signal is received.

24. The multimedia terminal adapter of claim 22, wherein the wake up circuitry is further configured to identify the wake up signal when an address in the chunks of data matches a corresponding address of the multimedia terminal adapter.

25. An apparatus, comprising:
means for receiving chunks of data from a cable modem termination system;
means for selectively removing power from the means for receiving, and
means for monitoring the chunks of data for a wake up signal, where the wake up signal is inserted into the chunks of data and portions of the chunks of data are overwritten.

* * * * *